Sept. 29, 1925.
A. T. SPENCER
1,555,767
BOX MAKING MACHINE
Filed Oct. 14, 1924
5 Sheets-Sheet 4
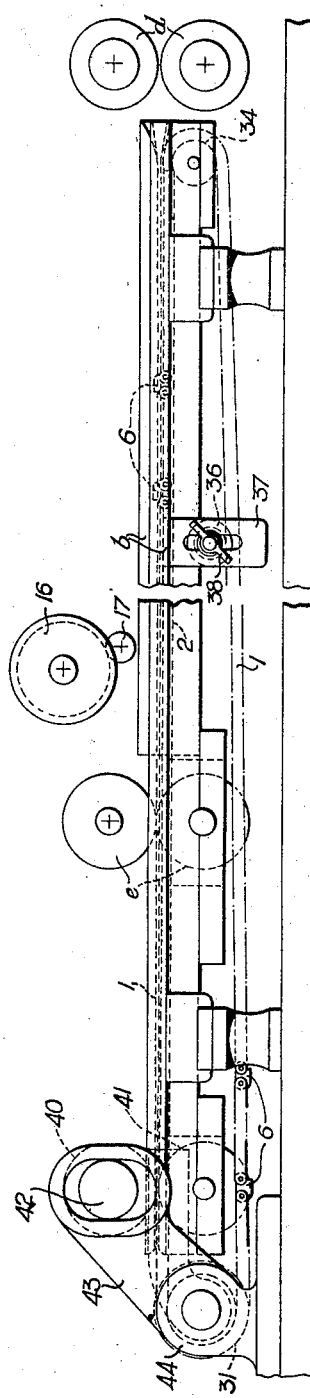
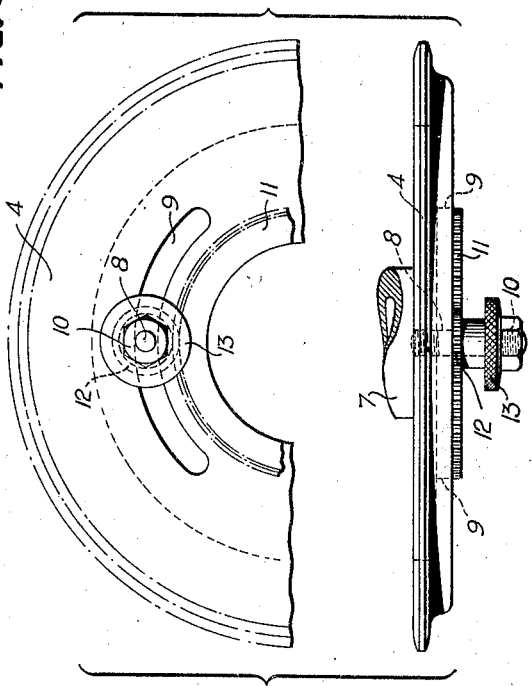
Inventor.
Alfred Thorn Spencer
by Connolly Bros.
Attys

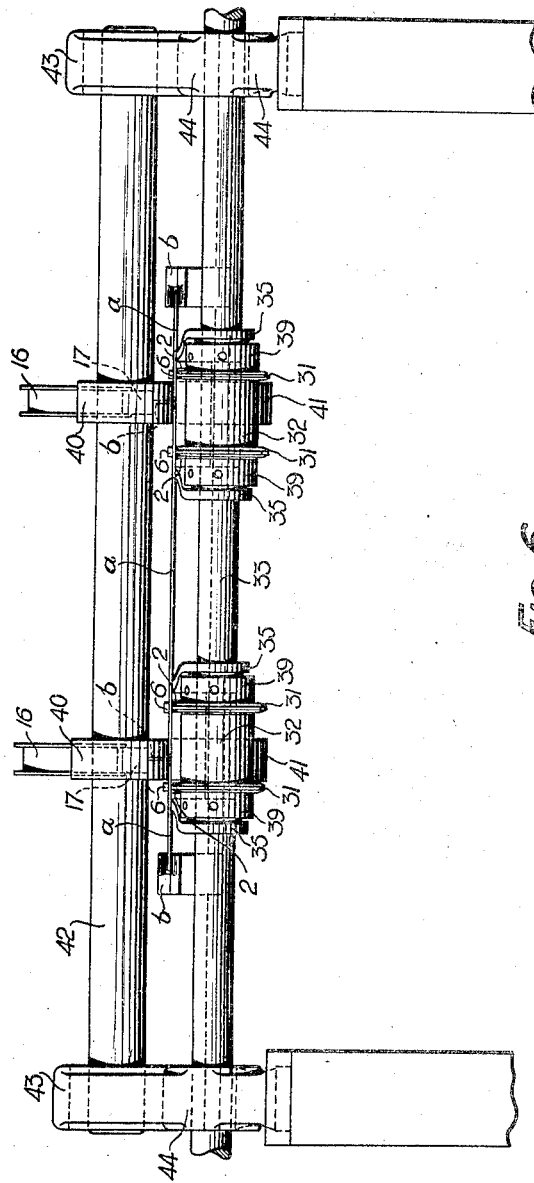

Patented Sept. 29, 1925.

1,555,767

UNITED STATES PATENT OFFICE.

ALFRED THORN SPENCER, OF LEICESTER, ENGLAND, ASSIGNOR OF TWO-THIRDS TO M. C. RITCHIE, LIMITED, OF LONDON, ENGLAND, A CORPORATION OF GREAT BRITAIN.

BOX-MAKING MACHINE.

Application filed October 14, 1924. Serial No. 743,530.

*To all whom it may concern:*

Be it known that I, ALFRED THORN SPENCER, a subject of the King of Great Britain, residing at Leicester, in the county of Leicester, England, have invented certain new and useful Improvements in or Relating to Box-Making Machines, of which the following is a specification, reference being had therein to the accompanying drawing.

This invention relates to machines for making box-blanks by assembling the component parts and uniting them by adhesive strips.

The invention comprehends an improved form of mechanism for co-relating the blank components and is mainly, though not exclusively, applicable to the machine described in British specification No. 19718 of 1913. In this machine the blank components are fed from piles or stacks to carrier guides along which they are moved by mechanism which co-relates them and then passes them on to devices which apply adhesive strips to fasten the co-related components together to form the box-blank. The mechanism which automatically co-relates the components after they have been fed and before they are joined together, has heretofore been of the reciprocating type and consisted of a reciprocating bar having thereon fingers to engage the blank components and push them along the carrier guides. After each forward operative stroke of the said bar it has been necessary that it should make an idle return stroke to normal position before the next set of blank components could be co-related.

The object of the present invention is to enable the machine to give a greater output in a given time without necessarily increasing the speed of travel of the components through the machine. This object is achieved by providing for a box-making machine of this kind an improved form of mechanism for co-relating the blank components and conveying them to the strip applying devices, said mechanism operating in such a manner that the time heretofore absorbed by the idle return stroke of co-relating members is saved.

The idea is to provide for the above mentioned purpose mechanism which will operate in a continuous manner so that the sets of blank components, although they may travel at the same rate of speed as formerly, follow one another in closer order with consequential increase in the output of the machine. For instance, the improved mechanism may include a number of blank engaging members which in their operative movement follow one another in succession. The operative movement of these members may be continuous, or it may, alternatively be intermittent.

In the preferred form of the invention, the mechanism for the aforesaid purpose comprises endless chains, bands, belts or similar means adapted or provided thereon with devices to engage the blank components and move them along the carrier guides after they have been fed.

Another form which may be adopted comprises a series of small wheels or rollers suitably rotated to impart the requisite travel to the blank components. Or blank engaging devices of suitable form may be actuated by rotary screws or equivalent means.

In any of the above mentioned forms the blank engaging devices, members or the like may be continuously moving or they may have an intermittent movement, but the feature is that they are of such a character and arrangement as will enable the sets of components to follow in closer order or more rapid succession than formerly.

In further describing the invention reference will be made to the accompanying drawings wherein, Figure 1 is a side elevation of a convenient embodiment of the invention.

Figure 4 is a detail hereinafter particularly referred to.

Figure 5 is a side elevation and

Figure 6 is an end elevation, viewed from the left of Figure 4, of a modified form of the invention.

Figures 3 and 4 are drawn to a larger scale than the remaining figures and like parts are designated by the same reference characters throughout the drawings.

Figure 1:
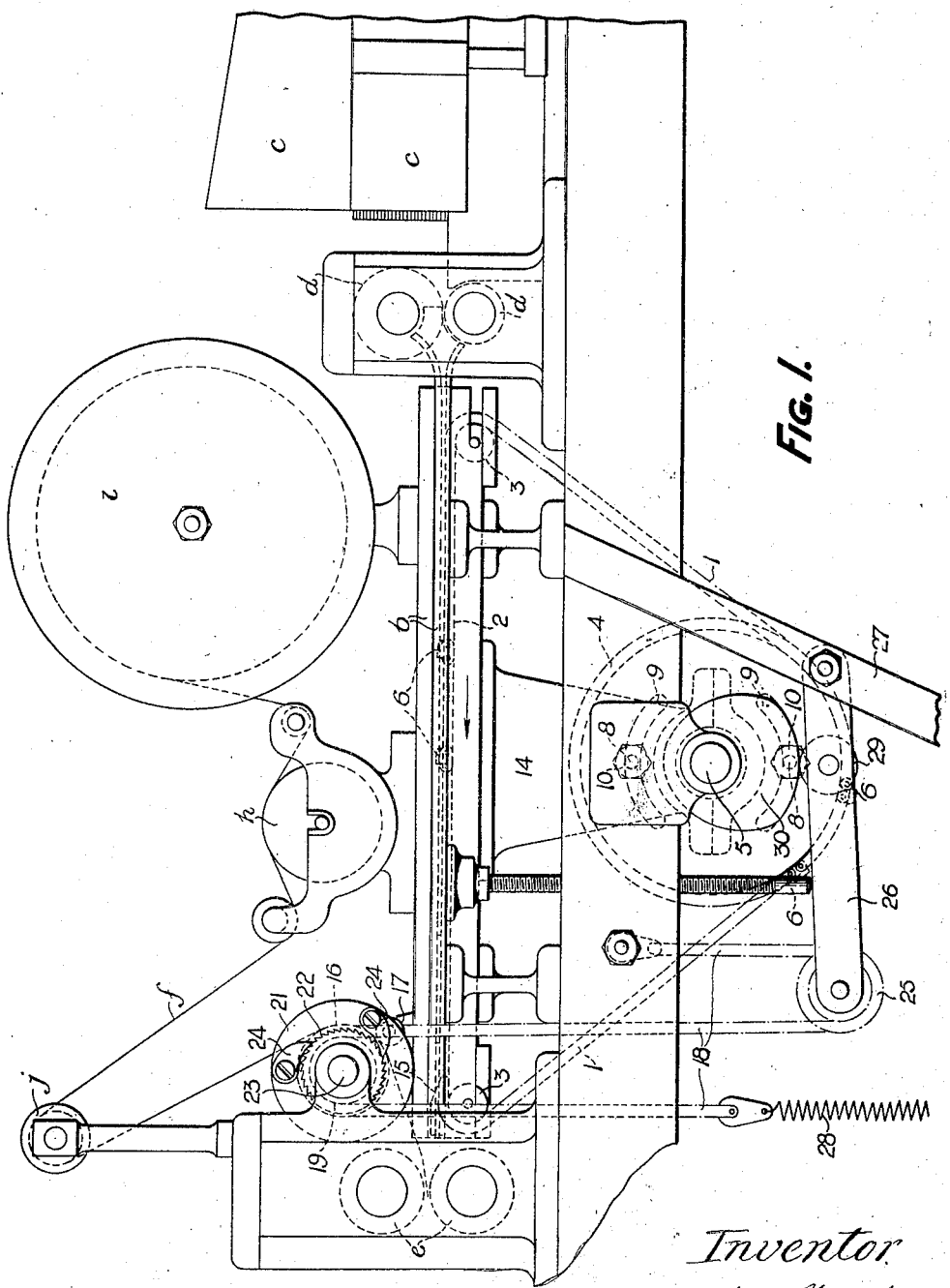

According to the embodiment of the invention illustrated in Figures 1 to 4, the mechanism for co-relating and conveying the blank components $a$ which travel along the grooved carrier guides $b$ adjustably mounted on the machine in the known manner, comprises a series of endless chains 1 there being, in the present instance, one chain for each side blank and two chains for the centre blank. These chains run parallel and adjacent to the inner guides $b$ and, if desired, channels 2 may be provided in the latter along which channels the chains 1 travel. The chains are carried by suitable pulleys or rollers 3 rotatably mounted in the guides at the opposite ends of each channel, and engage sprocket wheels 4 on a driven shaft 5 being driven thereby continuously in the same direction. Attached to the chains are sets of dogs or like projections 6 which engage with the rear edges of the blank components to push the latter along the guides. Since the chains travel continuously the dogs follow one another in a forward direction, i. e. the direction shown by the arrow in Figure 1, for dealing with the sets of components $a$ in succession. The dogs or projections 6 may be adjustable on the chains in order to ensure the proper co-relation of said components and in order that the relationship between the chains 1 may be adjusted for the same purpose, the sprocket wheels 4 are attached to the shaft 5 in a manner which admits rotary adjustment being effected. To this end the shaft 5 has keyed upon it a pair of hubs 7 to each of which two of the sprocket wheels are attached by means of studs 8, which are fixed in the hub and passed through slots 9 in said wheels, and nuts 10, in the manner shown in Figure 3. The slots in the inner sprocket wheels may be made longer than those in the outer wheels so as to permit of a more extensive adjustment of the chains carrying the dogs for engaging the centre blank. The sprocket wheels may be adjusted by loosening the nuts 10 and rotating said wheels on their hubs to the desired extent after which the nuts are again tightened.

If desired, in order to facilitate the adjustment of the sprocket wheels each of the latter may be provided with a toothed segment 11 see Figure 4 adapted to be engaged by a pinion 12 rotatably mounted on one of the studs 8. By means of a knurled knob or head 13 fast with the pinion 12 the latter can be turned to rotate the sprocket wheel to the desired extent on the hub, after which said wheel can be fastened to the hub or bobbin by tightening the nuts 10. By means of the adjustable sprocket wheels and the adjustability of the dogs on the chains, the said dogs can be brought into the desired co-relation for co-relating the blank components in each set. There may of course, be only one set of dogs on the chains. The hubs 7 are slidably keyed on the shaft 5 so as to permit of them being moved in company with the guides $b$ when the latter are adjusted to accommodate blanks of different widths. For this purpose also said hubs also rotate in yokes or brackets 14 suspended from the inner guides $b$.

Figure 2:
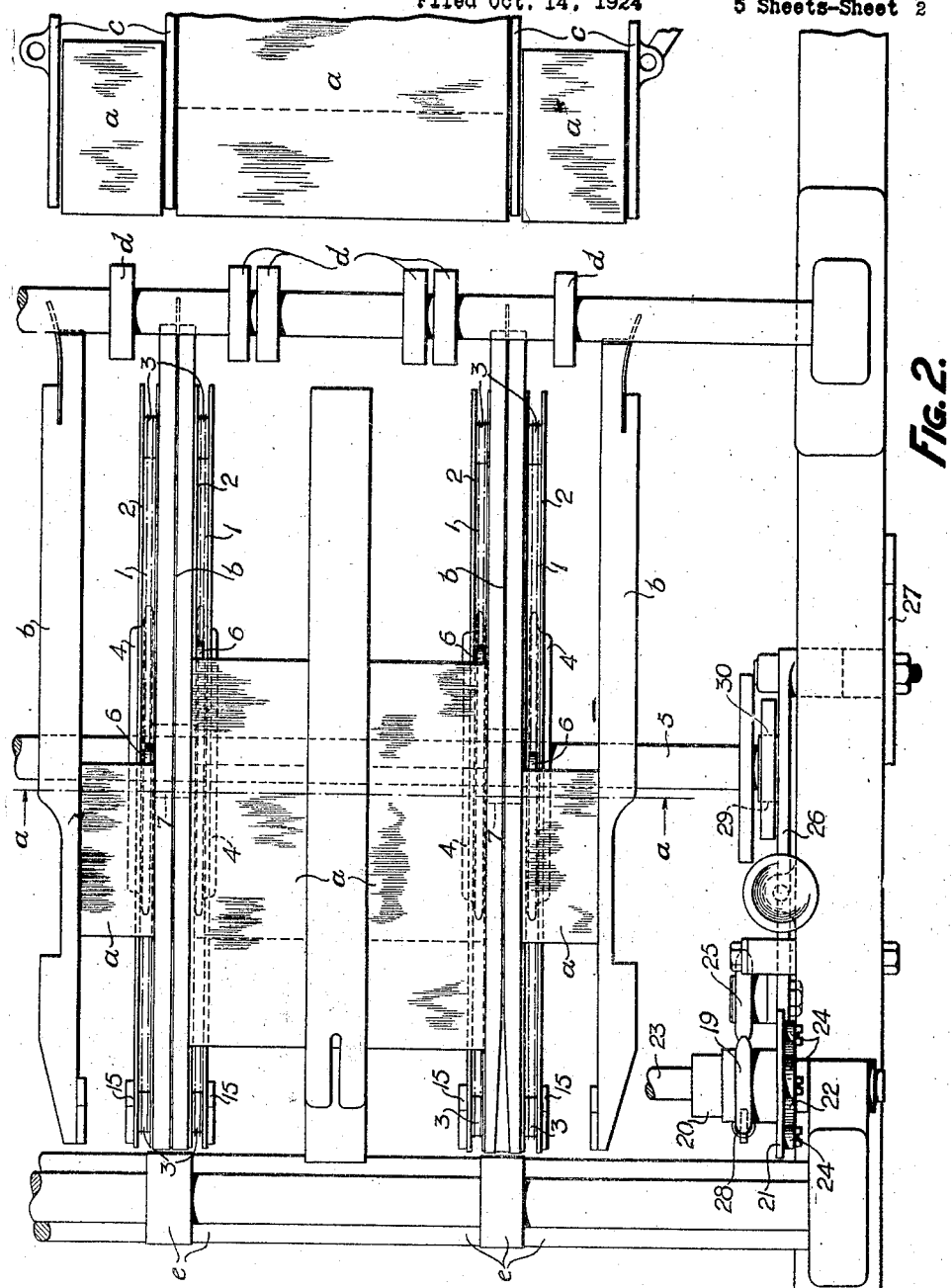
Figure 2 is a plan of the same omitting the means for supplying the adhesive strip.
Figure 3:
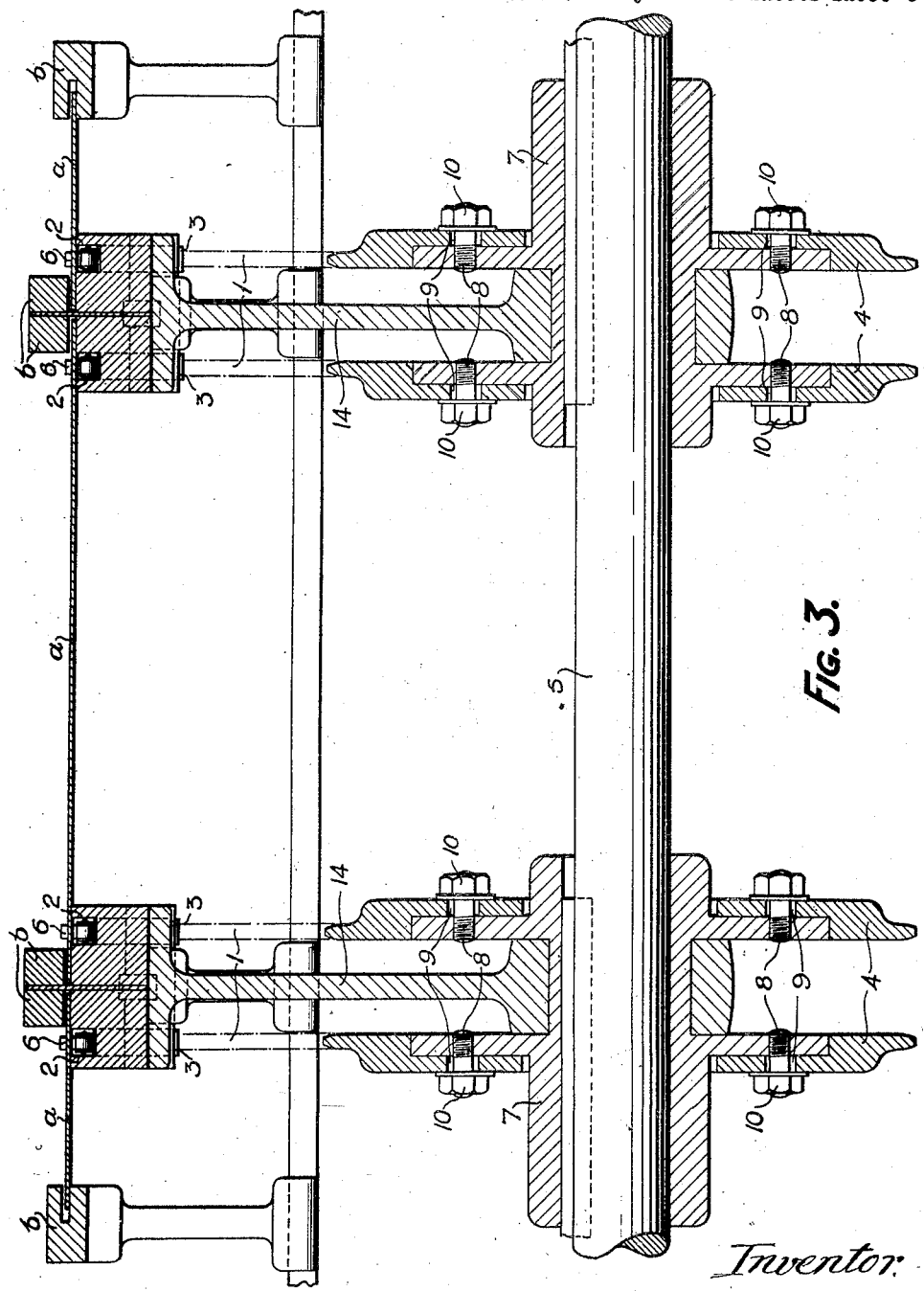
Figure 3 is a section taken on line *a—a* of Figure 2.

Each set of blanks is fed in the known manner from piles or stacks in a hopper or receptacle $c$ between suitably driven feed rollers $d$ by which the blanks are impelled into the carrier guides $b$, and thereafter the dogs or projections 6 on the travelling chains come up behind the components and by engaging the rear edges thereof move them into proper relative positions, as shown in Figure 2, and then push them along the guides and into the adhesive strip applying rollers $e$, wherein the adhesive strip is applied to the blanks to fasten them together in the usual way, after which the assembled blanks are deposited on a suitable table or other support (not shown).

At or near the front end of the carrier guides there are preferably provided members 15 having bevelled ends forming inclines to raise the blank components as they pass thereover and thus disengage the rear edges from the dogs or projections 6 before the chains pass round the adjacent carrier pulleys 3. This prevents the forward inclination of the dogs, consequential upon the passage of the chains round the carrier pulleys, from pressing upon the top of the components and tending to bind or bend them.

In conjunction with the improved co-relating mechanism it is found preferable to provide, for feeding the adhesive strips rotary means such for example as rollers or wheels 16 and 17 operating with an intermittent rotary movement. These rollers or wheels are conveniently driven by a chain 18 through the medium of a free wheel or one way clutch device which may comprise a sprocket wheel 19 on a sleeve 20 having a disc 21 thereon and rotatable on the hub of a ratchet wheel 22 fast on a shaft 23 on which the rollers 16 are mounted. The disc carries spring controller pawls 24 adapted to engage the ratchet wheel. The chain is anchored at one end to the machine frame and passes round a sprocket wheel 25, rotatably mounted in one end of a lever 26 fulcrumed upon a strut 27 attached to the machine frame, and round the sprocket wheel 19, the opposite end of the chain being attached to a tension spring 28. The lever 26 is provided with a cam roll 29 which is engaged by a cam 30 on the shaft 5 and the arrangement is that as the cam rotates the chain is pulled in one direction by the lever and in the reverse direction by the spring, intermittent rotation being thereby imparted to the rollers. Other means may, however, be adopted for driving said feed rollers.

The adhesive strips f are drawn by the feed rollers 16 and 17 from rolls in roll carriers i over damping devices h and guide rolls j of the usual form as is represented more or less diagrammatically in Figure 1, and severing devices (not shown) of any well known form are, of course, provided for severing the strips after the lengths required for application to each set of blanks have been fed.

According to the modified form of the invention illustrated in Figures 5 and 6 the chains 1 are carried by sprocket wheels 31, mounted on sleeves 32 slidably keyed on a shaft 33 located adjacent to the rear ends of the guides b and suitably driven, and by rollers 34 rotatably mounted in the opposite ends of the inner guides. The sleeves 32 are engaged by yoke members 35 attached to the adjacent ends of the inner carrier guides so as to be moved in company with said guides when the latter are adjusted for the purpose hereinbefore mentioned. Each chain is also engaged by a roller 36 carried by a bracket or plate 37 adjustably attached to the adjacent guide b and secured by a wing nut 38 or equivalent. By altering the position of this roller the tension of the chain may be varied.

The chains are provided with dogs or projections 6 as hereinbefore described, and in order that the relationship between the chains may be adjusted for properly co-relating the blanks the sprocket wheels 31 are adjustably mounted on the sleeves 32. To this end the ends of the sleeves are reduced to receive the sprocket wheels and are also screw threaded to receive nut devices 39 for clamping the wheels against the shoulders or abutments formed by reducing the ends of the sleeves. By slackening the nut devices the sprocket wheels may be turned to the required extent to bring the dogs or other projections 6 into the desired co-relation after which the wheels can be fastened by tightening the nuts again.

In the modified arrangement just described the blanks are fed into the carrier guides by rollers d and are acted upon by the dogs or projections 6 and the adhesive strip applying rollers, which in this case consist of a pair of rollers e associated with each of the inner carrier guides b and receiving the adhesive strip from the feed rollers 16 and 17, in a manner similar to that previously described herein. The chains 1 and consequently the carrier guide bars b are, however, extended somewhat beyond the rollers e so as to enable the dogs or projections to push the blanks into another series of pressing rollers 40, 41 for the purpose of subjecting the adhesive strips applied to the blanks to a second pressing before the assembled blanks are deposited on the table or other suitable support hereinbefore mentioned. There are two pairs of rollers in said series, one pair being associated with each of the inner guides b. The upper roller 40 of each pair is suitably mounted on a shaft 42 carried by extensions 43 of bearings 44, which latter carry the shaft 33, and the lower roller 41 is rotatably mounted in the corresponding carrier guide.

The shaft 33 may be driven by belt or other suitable gearing from any convenient source.

The details of construction may be varied without departing from the scope of the invention.

What I claim then is:—

1. In a box-making machine of the kind herein described, strip applying devices, and mechanism for co-relating the box blank components and conveying them to the strip applying devices, said mechanism operating in a continuous manner so that the sets of blank components follow one another in close order.

2. In a box-making machine of the kind herein described, means for feeding sets of box blank components in succession, devices for applying strips to said components, and mechanism for co-relating the components and conveying them from the feeding means to the strip applying means, said co-relating mechanism operating in a continuous manner.

3. For a box-making machine of the kind herein described, mechanism for co-relating box blanks in successive sets comprising a number of blank engaging members for corresponding blanks in the sets which members in their operative movement follow one another in succession.

4. In a box making machine of the kind herein described, means for feeding sets of box blank components, devices for applying strips to said components, and mechanism for co-relating the components in each set and conveying them from the feeding means to the strip applying devices, said mechanism comprising blank engaging members which in their operative movement follow one another in succession, said operative movement being continuous.

5. In a box making machine of the kind herein described, in combination, means for storing a number of box blanks, means for feeding sets of said blanks in succession, means for applying strips to the blanks in each set to join them together, and mechanism to engage the blanks in each set after feeding, co-relate them and convey them to the strip applying means, said co-relating mechanism operating in a continuous manner.

6. In a box making machine of the kind herein described, in combination, means for storing a number of box blanks in separate series, carrier guides for the blanks in each series, means for feeding sets of said blanks to the carrier guides, and means for moving the blanks in each set along the carrier guides and bringing them into proper co-relation for being joined together, said moving and co-relating means operating in a continuous manner.

7. In a box making machine of the kind herein described, in combination, means for storing a number of box blanks, carrier guides for said blanks, means for feeding the blanks to the carrier guides in successive sets, means for applying strips to the blanks in each set to connect them together, and mechanism operating in a continuous manner to co-relate the blanks in each set and move them along the carrier guides to the strip applying means.

8. For a box making machine of the kind herein described, mechanism for co-relating the box blank components in sets thereof, comprising travelling endless members and devices thereon to engage and move the blank components comprising each set.

9. For a box making machine of the kind herein described, carrier guides for sets of the box blank components, travelling endless members, and devices on said members to engage the blank components in each set and move them along the guides.

10. In a box making machine of the kind herein described, in combination, carrier guides for the box blank components, means for feeding the components to said guides in sets, endless chains running adjacent to said guides, and dogs on said chains to push the components along the guides.

11. In a box making machine of the kind herein described, in combination, carrier guides for the box blank components means for feeding the box blanks to said guides in successive sets, each comprising a plurality of blanks arranged side by side, endless chains running adjacent to said guides, and dogs on said chains to push blanks in of each set along their respective guides.

12. In a box making machine of the kind herein described, in combination, means for storing a number of box blanks, carrier guides for said blanks, means for feeding the blanks in successive sets to the carrier guides, means for applying strips to the blanks in each set, endless chains running adjacent to the carrier guides, and devices on said chains adapted to engage the blanks in each set after feeding and co-relate them and convey them along the guides to the strip applying means.

13. In a box making machine of the kind herein described, in combination, carrier guides for a plurality of the box blanks, endless chains running adjacent to said guides, devices on said chains to engage the box blanks in successive sets and push them along the guides, sprocket wheels for driving said chains and means for driving said sprocket wheel continuously in the same direction.

14. In a box making machine of the kind herein described, in combination, carrier guides for a plurality of the box blanks, endless chains running adjacent and parallel to said guides, sprocket wheels for driving said chains, means to impart rotation to said sprocket wheels continuously in the same direction, and devices on said chains arranged to operate one after another against the rear edges of successive sets of blanks each set comprising a plurality of blanks and convey them along the carrier guides.

15. In a box making machine of the kind herein described, in combination, carrier guides for the box blanks, endless chains running adjacent to said guides, devices on said chains to engage box blanks in guides and move them therealong, means to carry and impart movement to said chains, and means whereby relative adjustment between the chains may be effected to vary the position of the blank engaging devices of one chain relatively to those of another.

16. In a box making machine of the kind herein described, in combination, carrier guides for the box blanks, endless chains running adjacent to said guides, devices on said chains to engage box blanks in the guides and move them therealong, sprocket wheels for driving said chains, a shaft on which said sprocket wheels are mounted, and means whereby rotary adjustment of said wheels on said shaft may be effected to vary the relative operating positions of the blank engaging devices on the chains.

17. In a box making machine of the kind herein described, in combination, carrier guides for the box blanks, endless chains running adjacent to said guides means to carry said chains, devices on said chains to engage box blanks in the guides and move them therealong, a driven shaft, hubs fixed thereon, sprocket wheels on said hubs and driving the chains, and means to permit rotary adjustment of the wheels on the hubs.

18. In a box making machine of the kind herein described in combination, carrier guides for the box blanks, endless chains running adjacent to said guides, pulleys carrying said chains, devices on said chains to engage box blanks in the guides and move them therealong a driven shaft, hubs fixed thereon, sprocket wheels on said hubs and driving the chains, and studs and nuts fastening said sprocket wheels to the hubs, the sprocket wheels being slotted so as to be capable of rotary adjustment relatively to each other on the hubs.

19. In a box making machine of the kind herein described, in combination, carrier guides for the box blanks, endless chains running parallel to said guides, pulleys carrying the chains, devices on said chains to engage box blanks in the guides and move them therealong, a driven shaft, hubs fixed thereon, sprocket wheels on said hubs and driving the chains, studs and nuts fastening said sprocket wheels to the hubs said studs passing through slots in the wheels whereby the latter may be rotatably adjusted relatively to each other on the hubs, toothed segements on the sprocket wheels, pinions rotatably mounted on the studs and meshing with the toothed segments, and means for rotating the pinions to effect rotative adjustment of the sprocket wheels.

20. In a box making machine of the kind herein described, in combination, guides to carry a plurality of the box blanks side by side, endless chains running parallel to said guides, devices on said chains to engage with the rear edges of box blanks in the guides and move them therealong, and inclines located at the front ends of the carrier guides to raise the box blanks as they pass thereover and disengage the rear edges thereof from the devices on the chains.

21. In a box making machine of the kind herein described, in combination, guides to carry a plurality of the box blanks side by side, endless chains running parallel to said guides, pulleys carrying said chains, dogs on the chains to engage the rear edges of the box blanks to move the latter forward along the guides, and inclines located at the front ends of the carrier guides to raise the box blanks as they pass thereover and disengage the rear edges thereof from the dogs on the chains before the latter pass around the carrier pulleys.

22. In a box making machine of the kind herein described, in combination, carrier guides for the box blanks, means for applying strips to the box blanks for connecting them together, endless chains running adjacent to the carrier guides, devices on said chains to engage the box blanks and move them along the guides, and pressing rollers, said carrier guides and endless chains extending beyond the strip applying means so that the connected box blanks are pushed between the pressing rollers by the devices on the chains.

23. In a box making machine of the kind herein described, in combination, guides to carry a plurality of the box blanks side by side, endless chains running adjacent to said guides, sprocket wheels and rollers at the opposite ends of said guides carrying said chains, a driven shaft, and sleeves slidably keyed on said shaft, the sprocket wheels being carried by said sleeves.

24. In a box making machine of the kind herein described, in combination, guides to carry a plurality of the box blanks side by side, endless chains running adjacent to said guides, sprocket wheels and rollers at the opposite ends of the guides carrying the chains, a driven shaft, sleeves slidably keyed on said shaft and carrying said sprocket wheels, and means for adjustably securing the sprocket wheels to the sleeves.

25. In a box making machine of the kind herein described in combination, strip applying means, carrier guides to guide the box blanks to said means, continuously acting mechanism to convey the box blanks along said guides to the strip applying means, rotary devices operating with an intermittent rotary movement for feeding the strips, and means for actuating said rotary devices.

26. In a box making machine of the kind herein described, in combination, strip applying means, carrier guides to guide the box blanks to said means, continuously acting mechanism to convey the box blanks along said guides to the strip applying means, rotary devices for feeding the strips, and means for operating said devices with an intermittent rotary movement said means consisting of a free wheel clutch for driving said devices, a chain for actuating said free wheel clutch, a spring controlling said chains, a lever to actuate the chains, and a cam to actuate the lever.

In testimony whereof I affix my signature.

ALFRED THORN SPENCER.